(12) United States Patent
Sasaki et al.

(10) Patent No.: US 11,752,858 B2
(45) Date of Patent: Sep. 12, 2023

(54) FUEL FILTER DEVICE

(71) Applicant: NIFCO INC., Kanagawa (JP)

(72) Inventors: Hiroshi Sasaki, Kanagawa (JP); Shokei Yamada, Kanagawa (JP); Shohei Matsuda, Kanagawa (JP)

(73) Assignee: NIFCO INC., Kanagawa (JP)

( * ) Notice: Subject to any disclaimer, the term of this patent is extended or adjusted under 35 U.S.C. 154(b) by 309 days.

(21) Appl. No.: 17/283,035

(22) PCT Filed: Oct. 1, 2019

(86) PCT No.: PCT/JP2019/038813
§ 371 (c)(1),
(2) Date: Apr. 6, 2021

(87) PCT Pub. No.: WO2020/075581
PCT Pub. Date: Apr. 16, 2020

(65) Prior Publication Data
US 2021/0347250 A1 Nov. 11, 2021

(30) Foreign Application Priority Data
Oct. 11, 2018 (JP) .................. 2018-192283

(51) Int. Cl.
*B01D 29/13* (2006.01)
*B60K 15/04* (2006.01)
(Continued)

(52) U.S. Cl.
CPC .............. *B60K 15/04* (2013.01); *B01D 29/13* (2013.01); *B01D 35/027* (2013.01); *B01D 35/26* (2013.01);
(Continued)

(58) Field of Classification Search
CPC .......... B60K 15/04; B60K 2015/03236; B01D 29/13; B01D 35/027; B01D 35/26;
(Continued)

(56) References Cited

U.S. PATENT DOCUMENTS

2017/0304749 A1   10/2017   Niwa et al.

FOREIGN PATENT DOCUMENTS

JP          H07269437 A        10/1995
JP          2016089763 A   *   5/2016   ............. B01D 27/06
(Continued)

OTHER PUBLICATIONS

English translation of International Search Report for PCT Application PCT/JP2019/038813 dated Dec. 10, 2019; 1 p.

*Primary Examiner* — Waqaas Ali
(74) *Attorney, Agent, or Firm* — Armstrong Teasdale LLP

(57) ABSTRACT

A fuel filter device includes a filter cloth and a skeletal structural member including an inner flange portion positioned inside the filter cloth and a connecting member including an outer flange portion positioned outside the filter cloth, wherein a peripheral edge portion of an opening of the filter cloth is clamped between the inner flange portion and the outer flange portion, the inner flange portion and the outer flange portion jointly defining a center hole and a center bore serving as a communication passage communicating inside of the filter cloth with outside of the filter cloth, and the inner flange portion is provided with a sealing rib to compress the filter cloth to ensure a sealing performance thereof, a welding rib to join the skeletal structural member and the connecting member with each other by welding, and a shifting preventing rib configured to restrict shifting of the filter cloth.

5 Claims, 14 Drawing Sheets

(51) Int. Cl.
   *B01D 35/027*   (2006.01)
   *B01D 35/26*   (2006.01)
   *F02M 37/50*   (2019.01)
   *B60K 15/03*   (2006.01)

(52) U.S. Cl.
   CPC .. *B01D 2201/204* (2013.01); *B01D 2201/347* (2013.01); *B01D 2201/4076* (2013.01); *B60K 2015/03236* (2013.01); *F02M 37/50* (2019.01)

(58) Field of Classification Search
   CPC ........ B01D 2201/204; B01D 2201/347; B01D 2201/4076; B01D 29/111; B01D 35/0273; F02M 37/50; F02M 37/44
   See application file for complete search history.

(56) References Cited

FOREIGN PATENT DOCUMENTS

| | | | |
|---|---|---|---|
| JP | 2016089763 A | | 5/2016 |
| JP | 2017002834 A | * | 1/2017 |
| JP | 2017002834 A | | 1/2017 |

* cited by examiner

FUEL FILTER DEVICE

TECHNICAL FIELD

The present invention relates to a fuel filter device configured to be fitted to a fuel suction port placed in a fuel tank of an automobile or a motorcycle.

BACKGROUND OF THE INVENTION

Typically, a fuel tank of an automobile or a motorcycle is internally provided with a fuel suction port for drawing fuel into a fuel pump to supply the fuel to the engine, and a filter device (suction filter) is fitted to the fuel suction port to remove foreign matter therefrom.

In such a filter device, conventionally, an end of a pipe member is fitted with a filter cloth formed as a bag, and the fuel is passed through the filter cloth from outside to inside so that the fuel is delivered through the pipe member with foreign matter removed from the fuel. To secure the filer cloth to the pipe member, a clamping structure is adopted wherein the filter cloth is clamped between an inner flange portion positioned inside the filter cloth and an outer flange portion positioned outside the filter cloth. (See Patent Document 1.)

PRIOR ART DOCUMENT(S)

Patent Document(s)

Patent Document 1: JPH07-269437A

SUMMARY OF THE INVENTION

Task to be Accomplished by the Invention

During manufacture or assembly, the filter cloth could be misaligned in the clamping structure due to an external force applied to the filter cloth or the pipe member. Such misalignment of the filter cloth may compromise the liquid-tightness of the filter cloth and thereby impair filter performance. Further, if misalignment of the filter cloth occurs in the manufacturing process, the subsequent assembly of the filter cloth to the filter device or the fuel tank may be not performed properly. Therefore, it is desired to reliably prevent the filter cloth from being misaligned even when a large frictional force cannot be expected due to the surface characteristics of the filter cloth. The precision in filtration can be improved by using a filter cloth having a laminated structure. In such a case, since the quality of the filter material forming each layer varies, there is a strong need for a structure that provides a high level of liquid-tightness in a stable manner and is resistant to external forces.

The above-mentioned prior art employs a plurality of sharp claws formed in one of the clamping surfaces of the inner flange body and the outer flange body to keep the filter cloth fixed by biting into the filter cloth. However, according to this prior art, the shifting of the filter cloth may not be appropriately prevented when subjected to relatively large external force, and in particular, a significant shifting of the filter cloth tends to occur when subjected to a rotational external force.

In view of such a problem of the prior art, a primary object of the present invention is to provide a filter device having a clamping structure for clamping a filter cloth between an inner flange and an outer flange and configured to reliably prevent the impairment of filter performance that can be caused by the misalignment or the shifting of the filter cloth due to an external force.

Means to Accomplish the Task

In view of such a problem of the prior art, a primary object of the present invention is to provide a fuel filter device configured to be fitted to a fuel inlet positioned in a fuel tank, comprising:
 a filter cloth formed in a bag-shape;
 a first member positioned inside the filter cloth, the first member including an inner flange portion positioned inside the filter cloth; and
 a second member connected to a member provided on a side of a fuel pump, the second member including an outer flange portion positioned outside the filter cloth,
 wherein a periphery of an opening of the filter cloth is clamped between the inner flange portion and the outer flange portion, the inner flange portion and the outer flange portion jointly defining a communication passage communicating inside of the filter cloth with outside of the filter cloth, and at least one of the inner flange portion and the outer flange portion is provided with a sealing rib to compress the filter cloth to ensure a sealing performance thereof, a welding rib to join the inner flange portion and the outer flange portion with each other by welding, and a shifting preventing structure configured to restrict shifting of the filter cloth.

Thereby, a resistance against shifting or displacement of the filter cloth can be obtained so that the shifting of the filter cloth due to an external force can be prevented.

In this invention, preferably, the shifting preventing structure is provided between the sealing rib and the welding rib, the sealing rib being provided on outside of the welding rib.

Thereby, the shifting of the filter cloth due to an external force can be prevented while ensuring the sealing function of the sealing rib and the joining function of the welding rib.

In this invention, preferably, the shifting preventing structure includes a plurality of shifting preventing ribs extending radially.

Since the shifting preventing ribs bite into the filter cloth and compress the filter cloth, a resistance force against the shifting of the filter cloth can be obtained so that the shifting of the filter cloth due to an external force can be further prevented.

In this invention, preferably, the shifting preventing ribs are formed so as to extend radially from a center axis of the sealing rib.

Thereby, the resistance against the shifting of the filter cloth, particularly the shifting in the rotational direction can be increased so that the shifting of the filter cloth due to an external force can be prevented even more effectively.

In this invention, preferably, the shifting preventing structure includes a roughened surface or textured surface that contacts the filter cloth and is formed by a molding die.

Thereby, resistance to the shifting of the filter cloth can be obtained so that the shifting of the filter cloth due to an external force can be prevented.

In this invention, preferably, the shifting preventing structure includes a shifting preventing rib provided concentrically to the sealing rib and the welding rib.

Since the shifting preventing rib bites into the filter cloth and compresses the filter cloth, a resistance force against the shifting of the filter cloth can be obtained so that the shifting of the filter cloth due to an external force can be further prevented.

In this invention, preferably, the shifting preventing rib has a top surface having an irregular profile along a circumferential direction.

Thereby, the resistance against the shifting of the filter cloth, particularly the shifting in the rotational direction can be increased so that the shifting of the filter cloth due to an external force can be prevented even more effectively.

In this invention, preferably, the shifting preventing rib has a top surface having a wavy profile along a circumferential direction.

Thereby, the resistance against the shifting of the filter cloth, particularly the shifting in the circumferential direction can be increased so that the shifting of the filter cloth due to an external force can be prevented even more effectively.

In this invention, preferably, the shifting preventing rib has a top surface formed as a roughened surface or textured surface by a molding die.

Thereby, the resistance against the displacement of the filter cloth can be increased so that the displacement of the filter cloth due to an external force can be prevented even more effectively.

In this invention, preferably, the shifting preventing structure includes recesses formed in the inner peripheral surface of the sealing rib.

Since the filter cloth fits into the recesses, the resistance against the shifting of the filter cloth in the circumferential direction can be increased so that the shifting of the filter cloth due to an external force can be prevented even more effectively.

In this invention, preferably, one of the outer flange portion and the inner flange portion is provided with the sealing rib, and another of the outer flange portion and the inner flange portion is provided with an annular recess opposite to the sealing rib, an inner peripheral shoulder part of the annular recess being higher than an outer peripheral shoulder part thereof.

Since the filter fabric can be clamped between the outer flange portion and the inner flange portion in a smooth manner, application of an excessive force to the filter cloth during assembly can be avoided so that the shifting of the filter fabric can be prevented.

Effect of the Invention

Thus, the present invention provides a filter device having a clamping structure for clamping a filter cloth between an inner flange and an outer flange and configured to reliably prevent the impairment of filter performance that can be caused by the shifting of the filter cloth due to an external force.

DETAILED DESCRIPTION OF THE PREFERRED EMBODIMENT(S)

Preferred embodiments of the present invention as applied to a suction filter (fuel filter device) for use in an automobile or a motorcycle are described in the following with reference to the drawings.

First Embodiment

Figure 1:
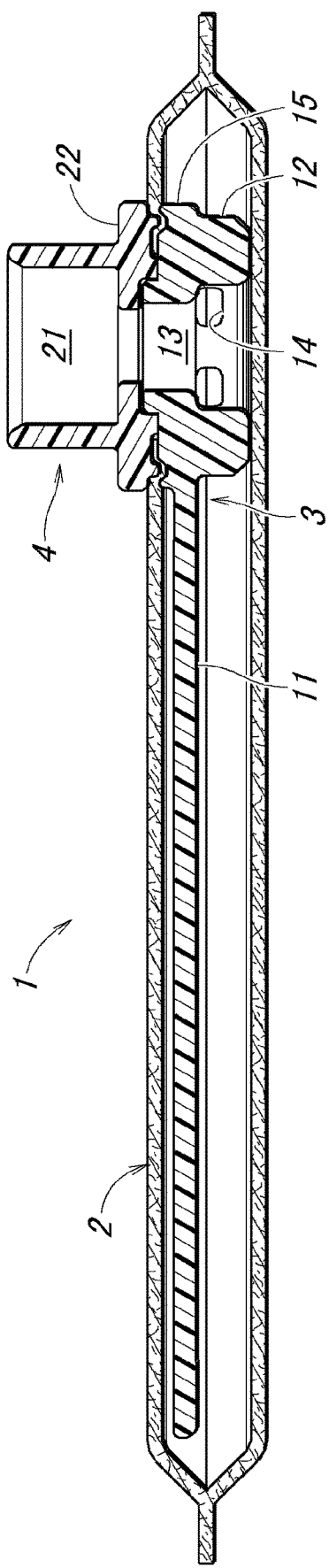
FIG. 1 is a sectional view of a fuel filter device according to a first embodiment of the present invention.

As shown in FIG. 1, the suction filter 1 is fitted to a fuel suction port of a fuel pump (not shown) in a fuel tank (not shown) to remove foreign matter mixed in the fuel when the fuel in the fuel tank is drawn by a fuel pump, and includes a filter cloth 2, a skeletal structural member 3 (first member), and a connecting member 4 (second member).

Figure 2:
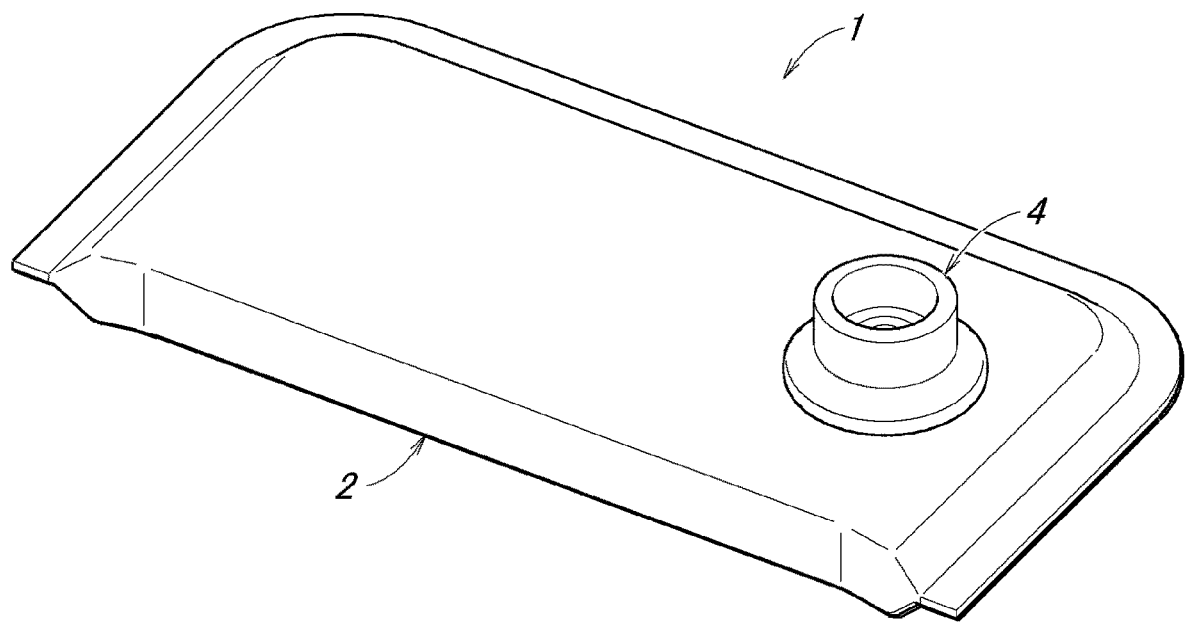
FIG. 2 is a perspective view of the fuel filter device of the first embodiment.

The filter cloth 2 is formed in a bag shape so as to enclose the skeletal structural member 3 (see FIG. 2). The structure of the filter cloth 2 is not particularly limited, and may have an SMS structure or a three-layer structure having layers of a spunbond material, a meltblown material, and a spunbond material laminated in this order, or a four or more layer structure having an additional layer of meltblown material, for example.

The skeletal structural member 3 is received inside the filter cloth 2 and includes a space maintaining portion 11 and a tubular portion 12. The space maintaining portion 11 maintains a space between the mutually opposing portions of the filter cloth 2, and ensures a necessary gap inside the filter cloth 2. The tubular portion 12 is provided with a center hole 13 and lateral holes 14. The skeletal structural member 3 can be formed of a synthetic resin material. In the present embodiment, the portion connected to the connecting member 4 consists of the tubular portion 12, but may also consist of other features or members, such as arcuate ribs arranged at intervals.

The connecting member 4 is connected to a member (not shown) on the side of the fuel pump. The connecting member 4 has a center bore 21. The center bore 21 and the center hole 13 of the skeletal structural member 3 jointly provide a communication passage that communicates the inside and outside of the filter cloth 2 with each other. The connecting member 4 may be formed of a synthetic resin material.

The fuel in the fuel tank flows through the filter cloth 2 from the outer side to the inner side of the filter cloth 2, and after foreign matter is removed therefrom, flows into the inside of the filter cloth 2. The fuel inside the filter cloth 2 flows into the center hole 13 via the lateral holes 14 of the skeletal structural member 3, and is then drawn into the fuel pump via the center bore 21 of the connecting member 4. Therefore, the skeletal structural member 3 and the connecting member 4 jointly function as a conduit member for conveying the fuel having foreign matter removed therefrom out of the filter cloth 2.

Figure 3:
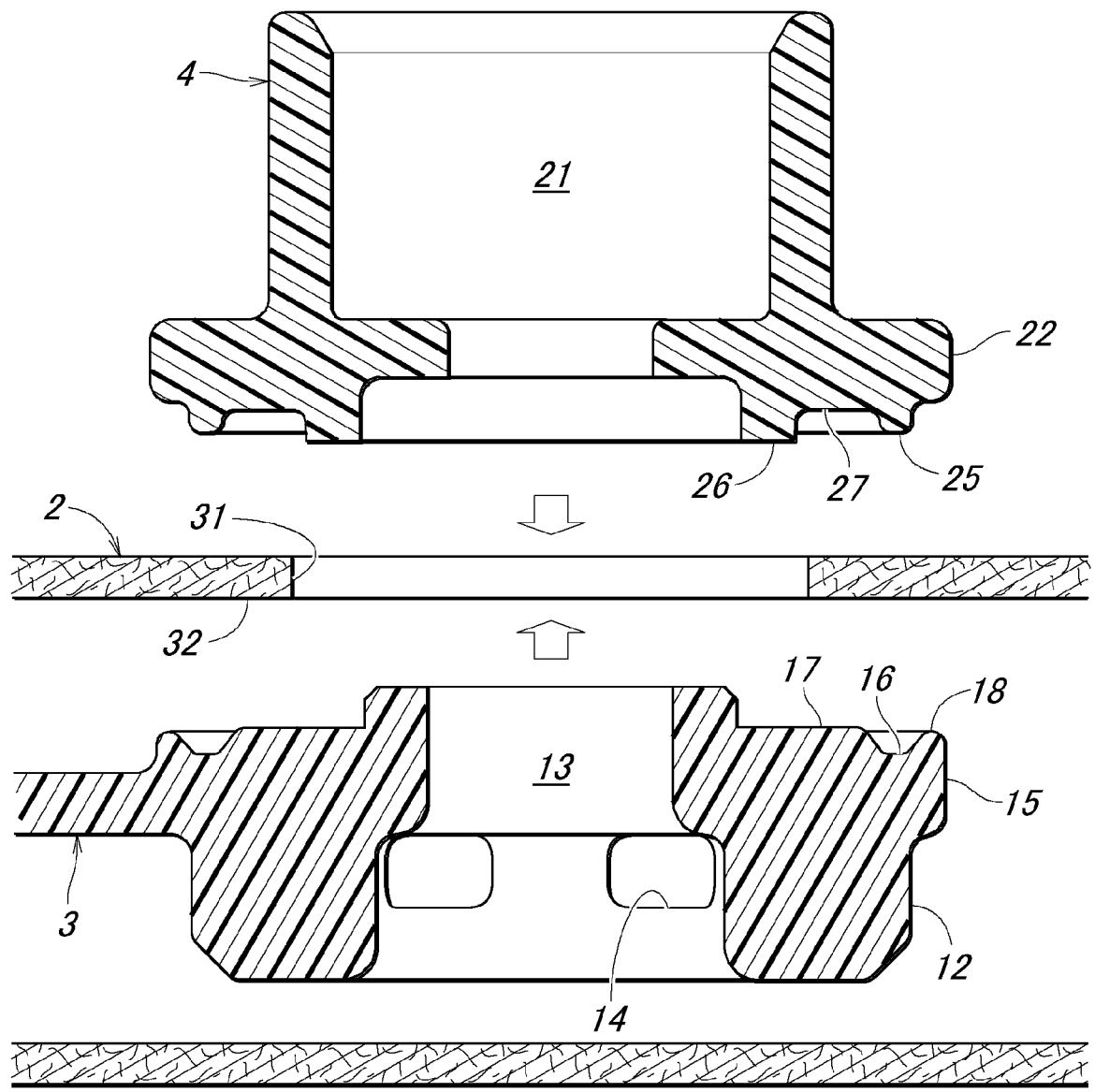
FIG. 3 is a fragmentary sectional view of the fuel filter device of the first embodiment before assembly.
Figure 4:
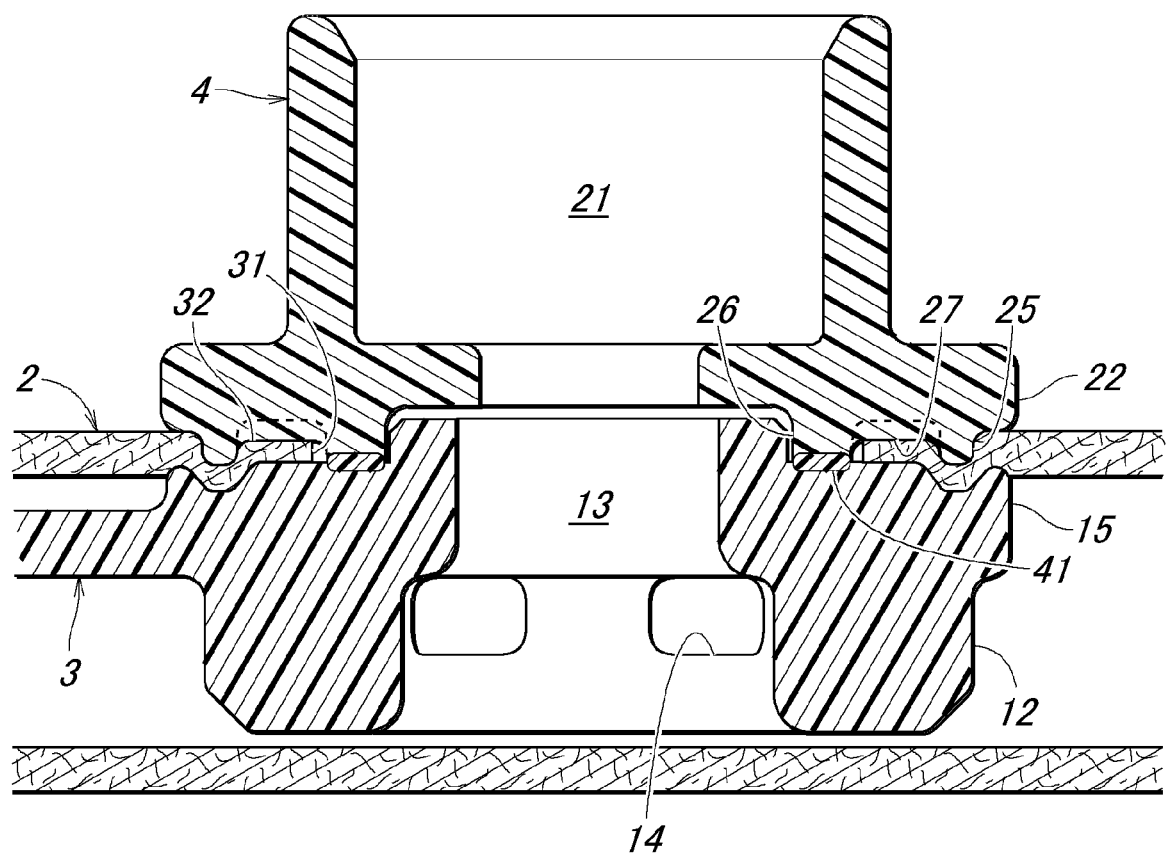
FIG. 4 is a fragmentary sectional view of the fuel filter device of the first embodiment after assembly.

As shown in FIG. 3, the filter cloth 2 is provided with an opening 31. The skeletal structural member 3 is provided with an inner flange portion 15 located inside the filter cloth 2, and the connecting member 4 is provided with an outer flange portion 22 located outside the filter cloth 2. In the assembled state, the peripheral edge portion 32 of the opening 31 of the filter cloth 2 is clamped between the inner flange portion 15 and the outer flange portion 22 as shown in FIG. 4.

The surface of the outer flange portion 22 opposing the inner flange portion 15 is provided with a sealing rib 25, a welding rib 26, and shifting preventing ribs 27.

Figure 5:
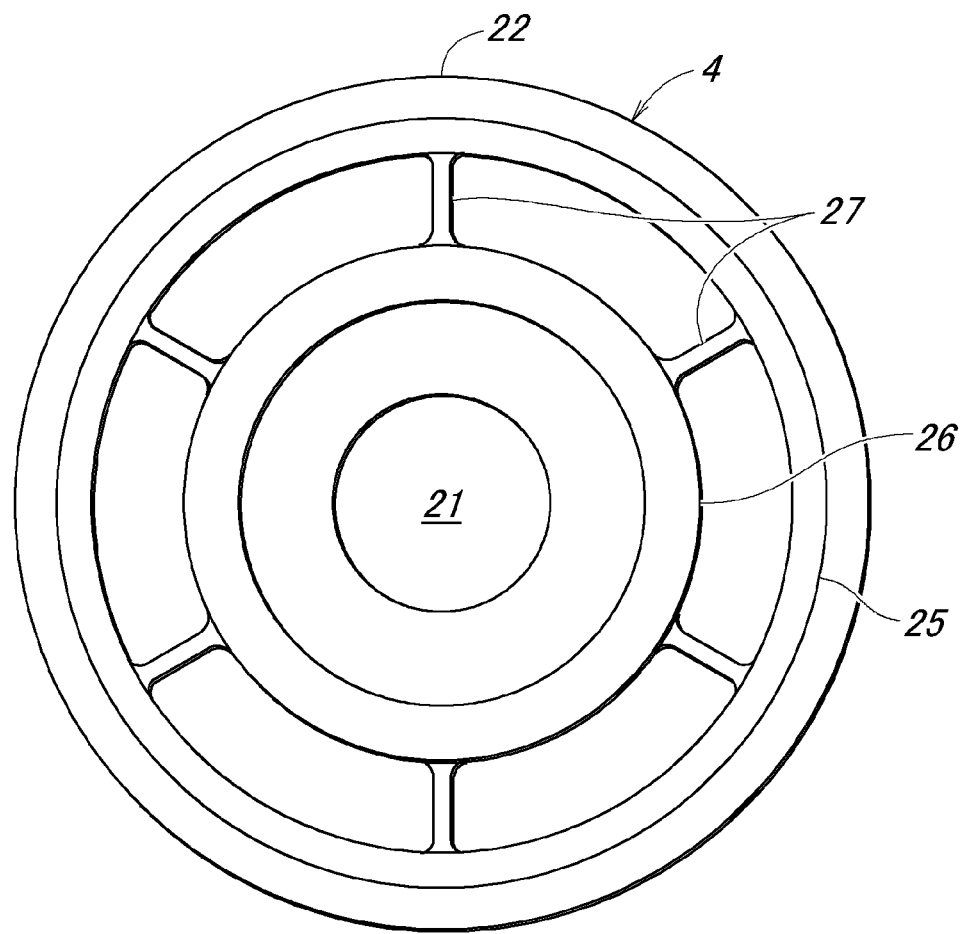
FIG. 5 is a plan view of an outer flange portion of the first embodiment.

As shown in FIG. 5, the sealing rib 25 is provided concentrically with the center bore 21 of the outer flange portion 22, and is formed so as to extend over the entire outer circumference of the outer flange portion 22. In the assembled state (see FIG. 4), the sealing rib 25 compresses the filter cloth 2, and bites into the filter cloth 2 so that a sealing against the intrusion of foreign matter from the outside to the inside of the filter cloth 2 is ensured.

The welding rib 26 is provided concentrically with the center bore 21 of the outer flange portion 22, and is formed so as to extend over the entire circumference of the center bore 21 on the outside of the center bore 21. As shown in FIG. 4, the welding rib 26 is welded to the opposing part of the inner flange portion 15 by ultrasonic welding or the like. The skeletal structural member 3 and the connecting member 4 are joined by a thus created welded portion 41 so that the filter cloth 2, the skeletal structural member 3, and the connecting member 4 are integrally joined to one another.

In this embodiment, the center hole 13 and the center bore 21 are provided so as to be located centrally of the inner flange portion 15 and the outer flange portion 22, respectively, and to jointly form a communication passage communicating the inside and the outside of the filter cloth 2 with each other. However, this communication passage may also be provided in an eccentric relationship to the center axis of the inner flange portion 15 and the outer flange portion 22.

As shown in FIG. 5, the shifting preventing ribs 27 are provided between the sealing rib 25 and the welding rib 26. Further, in the present embodiment, the shifting preventing ribs 27 are arranged radially. In the assembled state (see FIG. 4), the shifting preventing ribs 27 compress the filter cloth 2 so as to bite into the filter cloth 2 (see FIG. 4) in a similar manner to the sealing rib 25, and secures the filter cloth 2 in place and prevents the shifting of the filter cloth 2 in cooperation with the sealing rib 25.

In particular, in this embodiment, the shifting preventing ribs 27 are formed so as to extend in the radial direction around the center axis of the sealing rib 25. In this way, by arranging the shifting preventing ribs 27 so as to extend orthogonally (in the radial direction) to the rotational direction (circumferential direction), the surface in contact with the filter cloth 2 becomes uneven or irregular in the rotational direction so that the restraining force against the rotation of the filter cloth 2 can be increased.

Further, since the shifting preventing ribs 27 are connected between the sealing rib 25 and the welding rib 26 by having the outer ends thereof connected to the sealing rib 25 and the inner ends thereof connected to the welding rib 26, the strength of the shifting preventing ribs 27 can be increased so that the shifting of the filter cloth 2 can be prevented in an even more effective manner.

Figure 6:
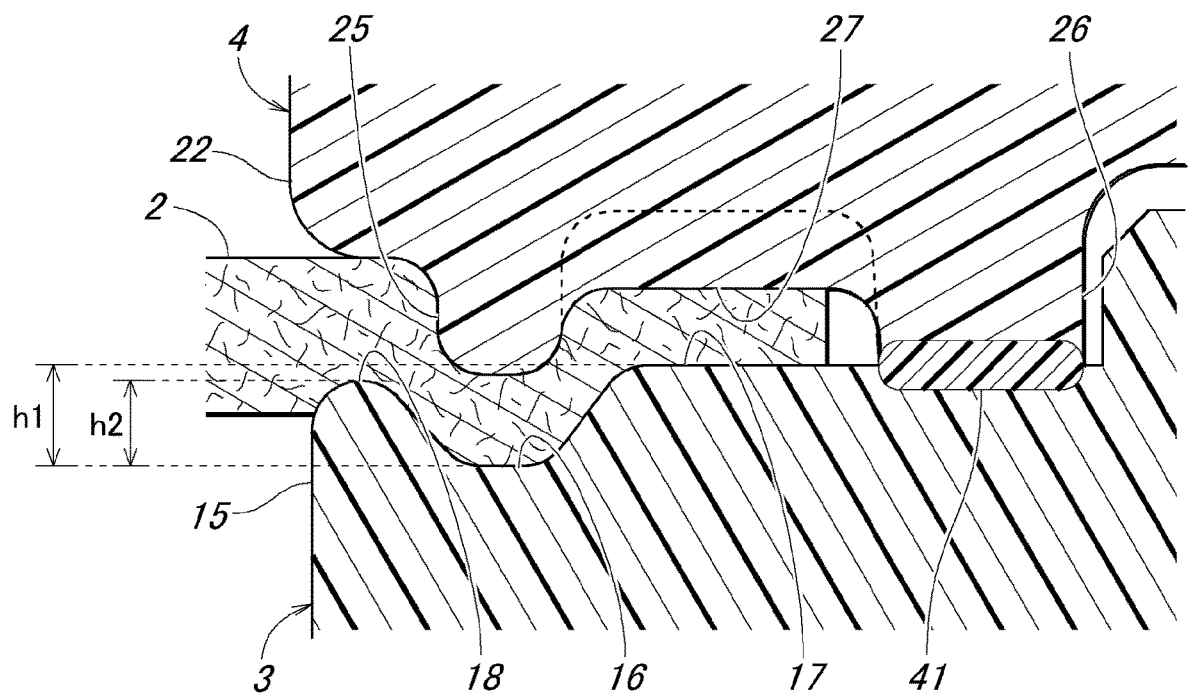
FIG. 6 is an enlarged fragmentary sectional view of the fuel filter device of the first embodiment.

Further, as shown in FIG. 6, the inner flange portion 15 is provided with an annular recess 16 in a part thereof opposing the sealing rib 25, and the inner peripheral shoulder portion 17 of the annular recess 16 is formed so as to be higher than the outer peripheral shoulder portion 18 of the annular recess 16. Thus, the height h1 of the inner peripheral shoulder portion 17 of the annular recess 16 is greater than the height h2 of the outer peripheral shoulder portion 18 of the annular recess 16. As a result, the filter cloth 2 is smoothly clamped between the inner flange portion 15 and the outer flange portion 22 so that an excessive external force is prevented from acting on the filter cloth 2 during assembly, and the shifting of the filter cloth 2 can be prevented.

The shifting preventing ribs 27 are provided between the sealing rib 25 and the welding rib 26 in this embodiment, but the shifting preventing ribs 27 may also be provided outside the sealing rib 25.

Second Embodiment

A second embodiment of the present invention is described in the following. It should be noted that the second embodiment is similar to the first embodiment in regard to the parts thereof not particularly described in the following.

Figure 7:
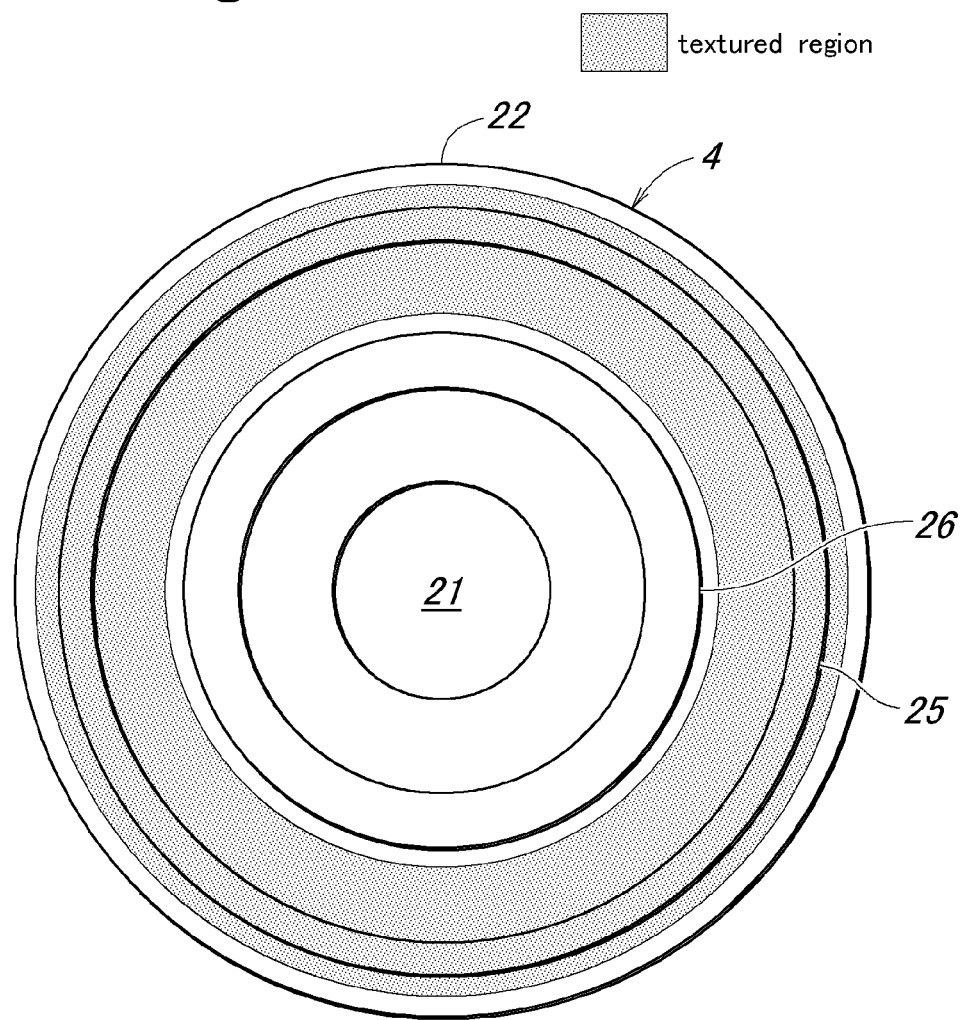
FIG. 7 is a plan view of an outer flange portion according to a second embodiment of the present invention.
Figure 8:
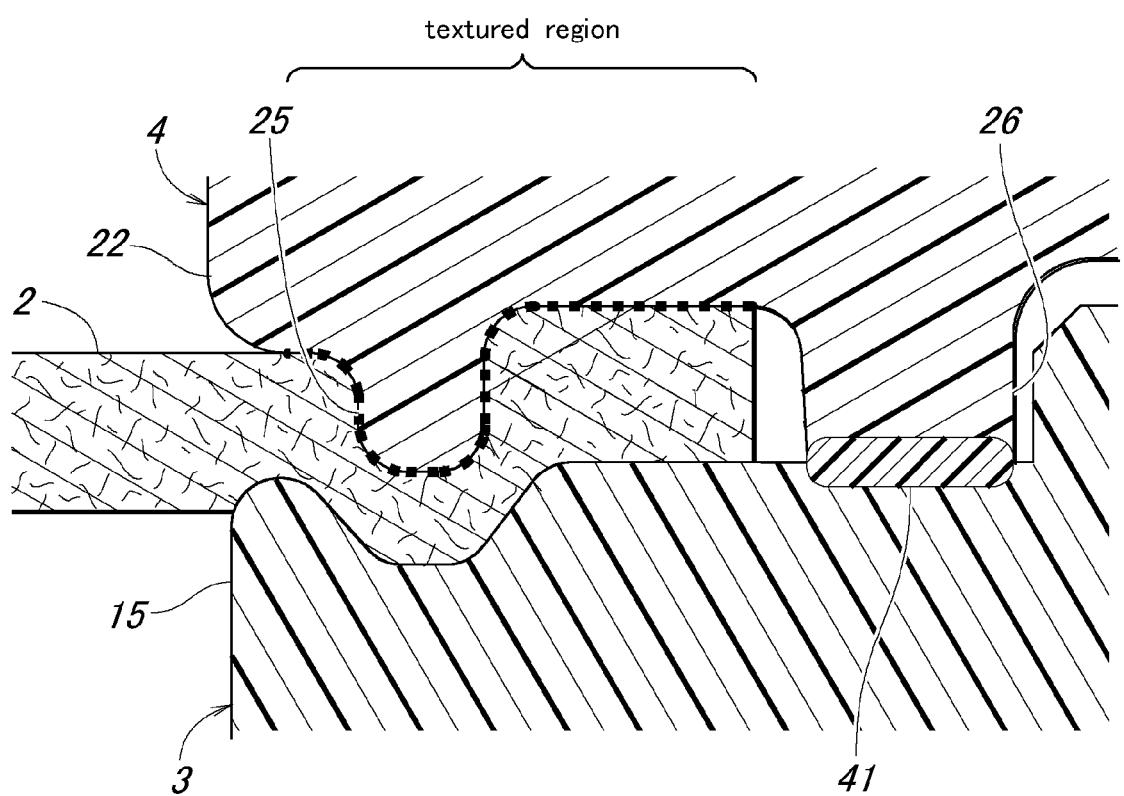
FIG. 8 is an enlarged fragmentary sectional view of the fuel filter device of the second embodiment.

The shifting preventing structure for restricting the shifting of the filter cloth 2 of the first embodiment consisted of the shifting preventing ribs 27 provided on the outer flange portion 22 of the connecting member 4, but in the present embodiment, as shown in FIGS. 7 and 8, the shifting preventing structure is formed by a textured surface of the outer flange portion 22 of the connecting member 4 that is formed by a molding die and comes into contact with the filter cloth 2. By thus increasing the frictional force between the filter cloth 2 and the outer flange portion 22, the shifting of the filter cloth 2 can be prevented.

The entire surface part of the outer flange portion 22 of the connecting member 4 that comes into contact with the filter cloth 2 is textured in the example shown in FIGS. 7 and 8, but the surface part of the outer flange portion 22 of the connecting member 4 that comes into contact with the filter cloth 2 may also be only partly textured. The textured surface is formed by a molding die in this embodiment, but other surface process can also be used for increasing the frictional force between the filter cloth 2 and outer flange portion 22.

Third Embodiment

A third embodiment of the present invention is described in the following. It should be noted that the third embodiment is similar to the previous embodiments in regard to the parts thereof not particularly described in the following.

Figure 9:
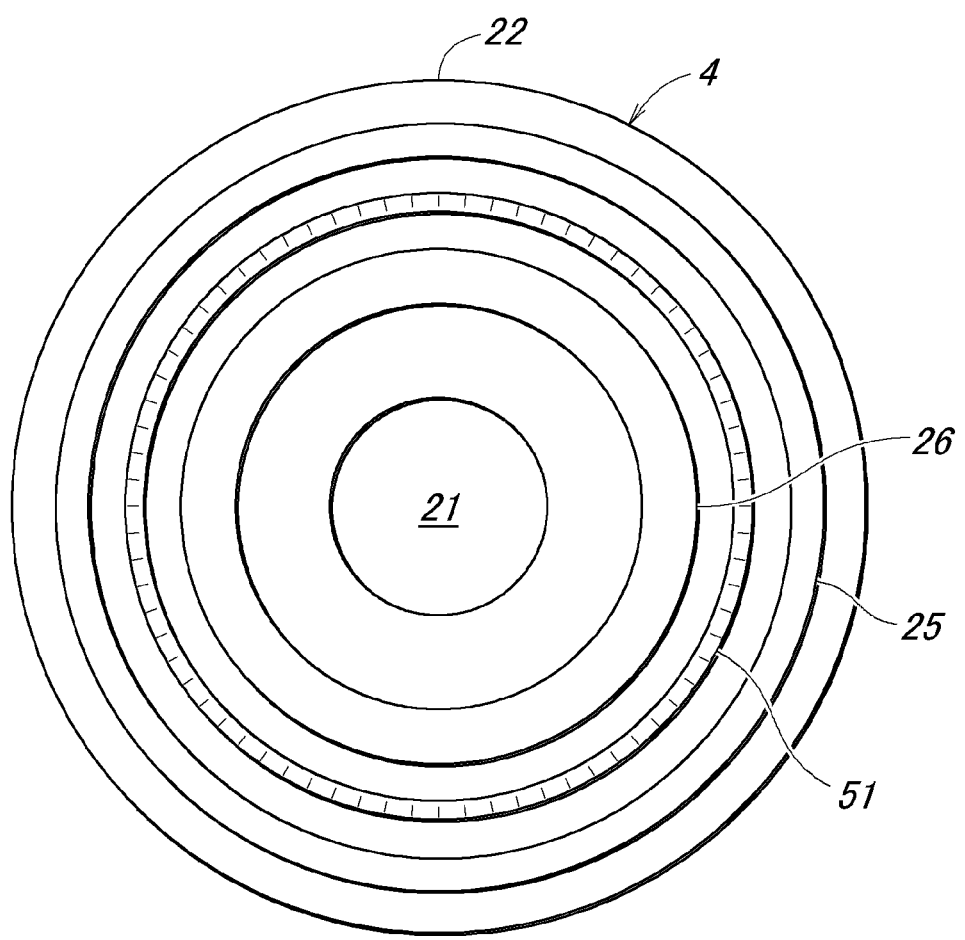
FIG. 9 is a plan view of an outer flange portion according to a third embodiment of the present invention.
Figure 10:
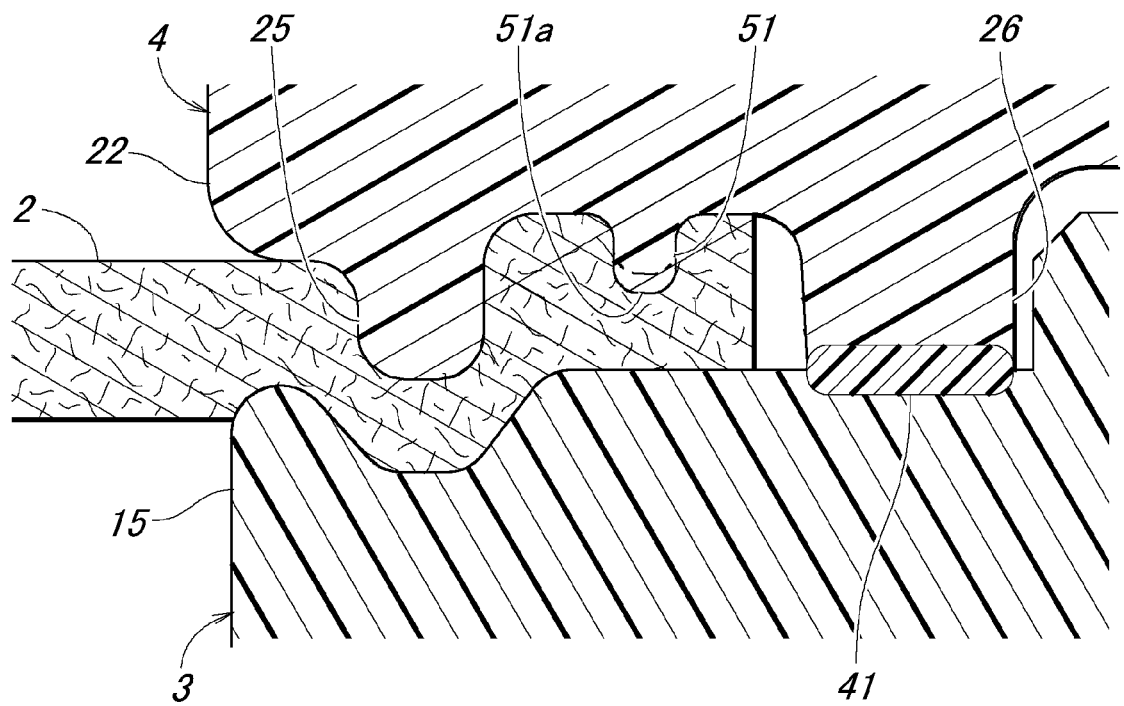
FIG. 10 is an enlarged fragmentary sectional view of the fuel filter device of the third embodiment.

In the first embodiment, the radial shifting preventing ribs 27 were provided on the outer flange portion 22 of the connecting member 4 as a shifting preventing structure for preventing the shifting of the filter cloth 2. In the present embodiment, as shown in FIGS. 9 and 10, a shifting preventing rib 51 is provided on the outer flange portion 22 in a concentric relationship to the sealing rib 25 and the welding rib 26. The shifting preventing rib 51 is provided so as to extend over the entire circumference in a part positioned between the sealing rib 25 and the welding rib 26.

Figure 11A:
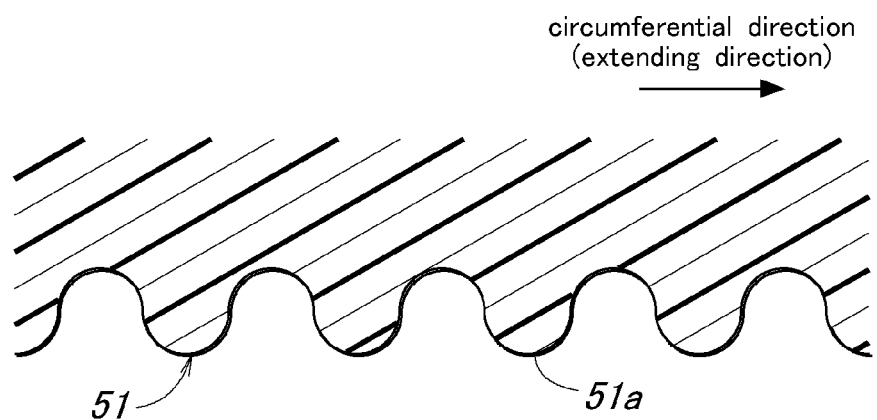
FIG. 11 is a sectional view of a top surface portion of a shifting preventing rib in the fuel filter device of the third embodiment.
Figure 11B:
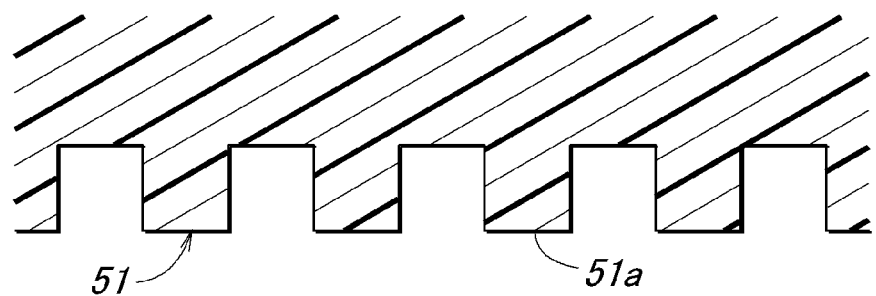

Further, as shown in FIG. 11(A), the top surface 51a of the shifting preventing rib 51 is formed so as to have a wavy shape along the circumferential direction (extending direction), or arcuate segments in a sectional view taken along the circumferential direction. Alternatively, as shown in FIG. 11(B), the top surface 51a of the shifting preventing rib 51 is formed so as to have a castellated shape along the circumferential direction, or a dentil shape in a sectional view taken along the circumferential direction. As a result, the resistance against the shifting of the filter cloth 2, particularly the shifting in the rotational direction can be increased so that the shifting of the filter cloth 2 can be prevented.

In the present embodiment, the top surface 51a of the shifting preventing rib 51 is formed in a wavy shape or a rectangular irregular shape, but the top surface 51a of the shifting preventing rib 51 may be textured instead. Further, the top surface 51a of the shifting preventing rib 51 may be formed in a wavy shape or a rectangular irregular shape, and textured as well.

Modification of Third Embodiment

A modification of the third embodiment of the present invention is described in the following. It should be noted that this modified embodiment is similar to the previous embodiments in regard to the parts thereof not particularly described in the following.

In the third embodiment, the shifting preventing rib 51 was formed in a circular shape and extended over the entire circumference of the outer flange portion 22. On the other hand, in the present modified embodiment, the shifting preventing rib 61 is formed as arcuate segments so that the third embodiment is modified by cutting away parts of the circular shifting preventing rib 51 of the third embodiment. As a result, the filter cloth 2 fits into the gaps between the arcuate segments of the shifting preventing rib 61 so that the resistance force against the shifting of the filter cloth 2 in the rotational direction can be increased.

Figure 12:
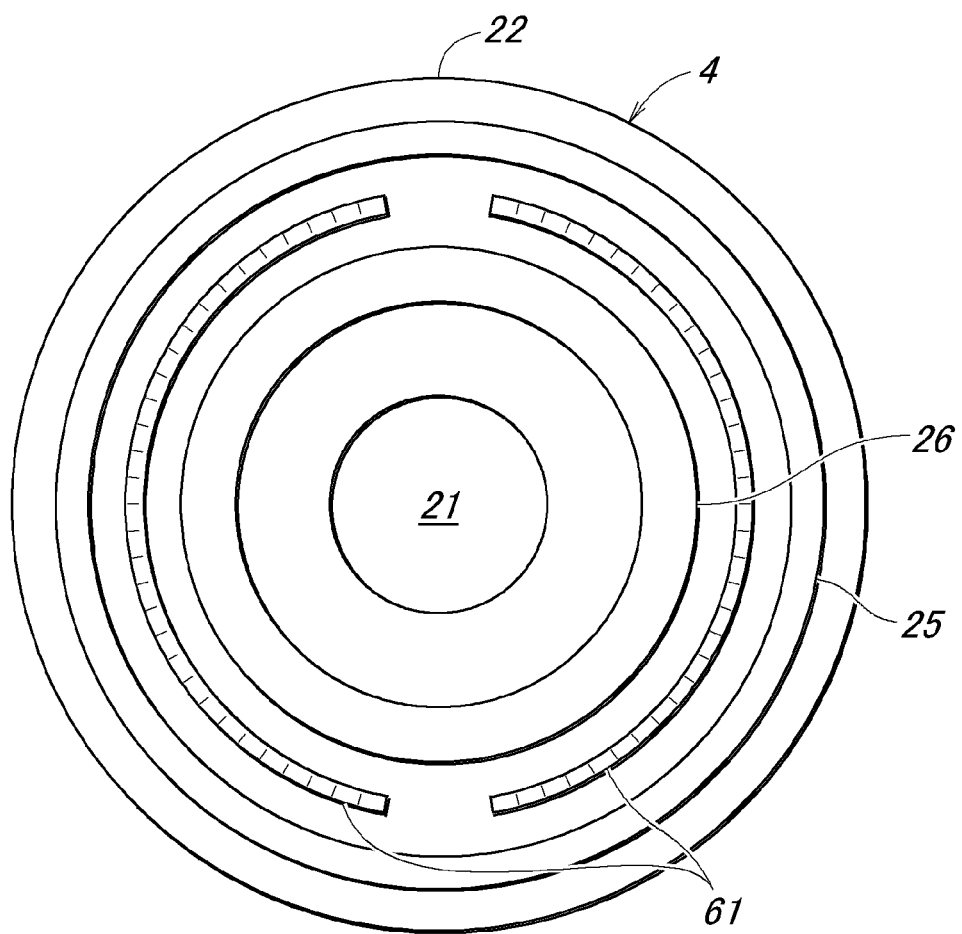
FIG. 12 is a plan view of an outer flange portion according to a modification of the third embodiment of the present invention.

In addition, the shifting preventing rib 61 of the example shown in FIG. 12 is provided with two arc shaped segments, but the shifting preventing rib 61 may include three or more arc shaped segments, instead.

Fourth Embodiment

A fourth embodiment of the present invention is described in the following. It should be noted that the fourth embodiment is similar to the previous embodiments in regard to the parts thereof not particularly described in the following.

Figure 13:
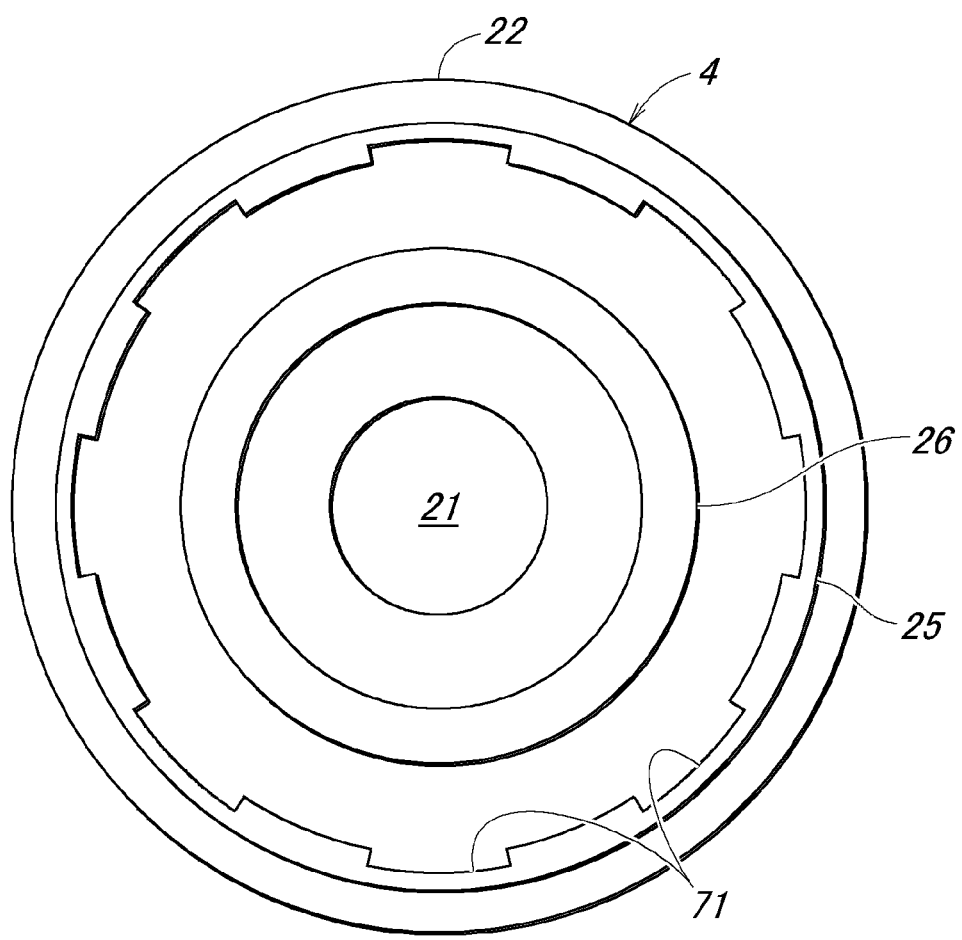
FIG. 13 is a plan view of an outer flange portion according to a fourth embodiment of the present invention.
Figure 14:
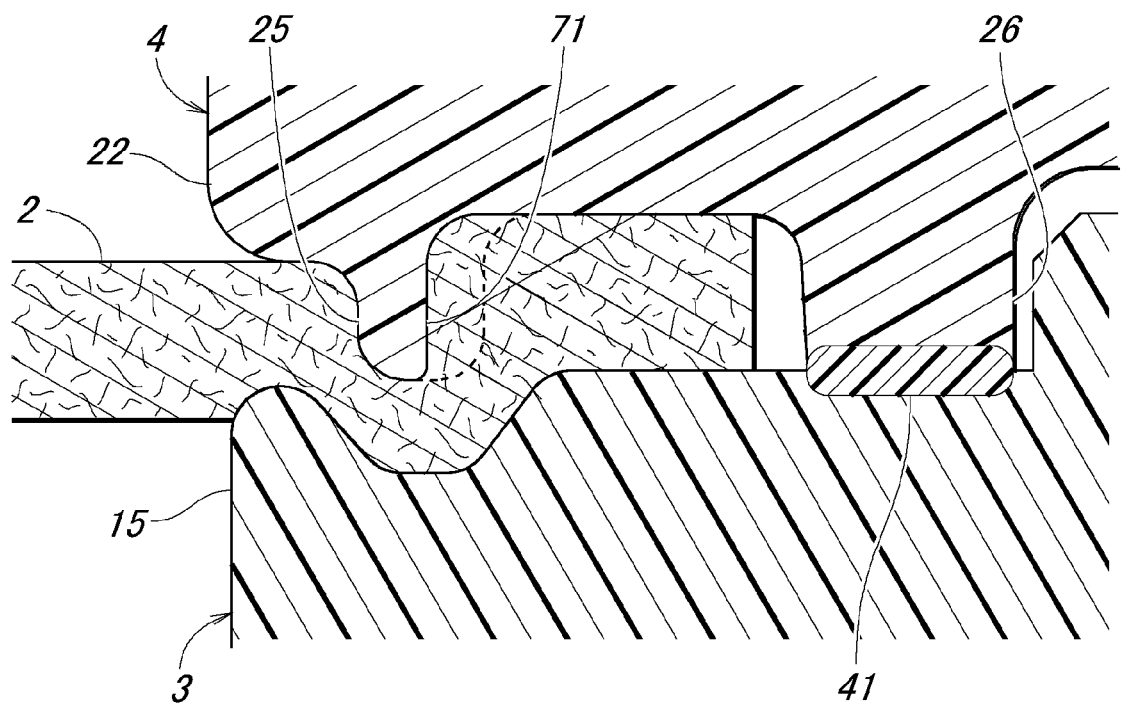
FIG. 14 is an enlarged fragmentary sectional view of the fuel filter device of the fourth embodiment.

In the present embodiment, as shown in FIGS. 13 and 14, a plurality of recesses 71 are provided on the inner peripheral surface of the sealing rib 25 as a shifting preventing structure for preventing the shifting of the filter cloth 2. The recesses 71 are provided at regular intervals in the circumferential direction. As a result, the filter cloth 2 fits into the recesses 71 so that resistance against the shifting of the filter cloth 2 in the rotational direction is produced, and the shifting of the filter cloth 2 can be prevented.

The present invention has been described in terms of specific embodiments, but is not limited by such embodiments, and can be modified in various ways without departing from the scope of the present invention.

REFERENCE NUMERALS

| | |
|---|---|
| 1 | suction filter (fuel filter device) |
| 2 | filter cloth |
| 3 | skeletal structural member (first member) |
| 4 | connecting member (second member) |
| 11 | space maintaining portion |
| 12 | tubular portion |
| 13 | center hole |
| 14 | lateral hole |
| 15 | inner flange portion |
| 16 | annular recess |
| 17 | inner peripheral portion |
| 18 | outer peripheral portion |
| 21 | center bore |
| 22 | outer flange portion |
| 25 | sealing rib |
| 26 | welding rib |
| 27 | shifting preventing rib |
| 31 | opening |
| 32 | peripheral edge portion |
| 41 | welded portion |
| 51 | shifting preventing rib |
| 61 | shifting preventing rib |
| 71 | recess |

The invention claimed is:

1. A fuel filter device configured to be fitted to a fuel inlet positioned in a fuel tank, comprising:
   a filter cloth formed in a bag-shape;
   a first member positioned inside the filter cloth, the first member including an inner flange portion positioned inside the filter cloth; and
   a second member connected to a member provided on a side of a fuel pump, the second member including an outer flange portion positioned outside the filter cloth,
   wherein a periphery of an opening of the filter cloth is clamped between the inner flange portion and the outer flange portion, the inner flange portion and the outer flange portion jointly defining a communication passage communicating inside of the filter cloth with outside of the filter cloth, and at least one of the inner flange portion and the outer flange portion is provided with a sealing rib to compress the filter cloth to ensure a sealing performance thereof, a welding rib to join the inner flange portion and the outer flange portion with each other by welding, and a shifting preventing structure configured to restrict shifting of the filter cloth,
   wherein the shifting preventing structure is provided between the sealing rib and the welding rib, the sealing rib being provided outside of the welding rib,
   wherein the shifting preventing structure includes a plurality of shifting preventing ribs extending radially.

2. The fuel filter device as defined in claim 1, wherein the shifting preventing ribs are formed so as to extend radially from a center axis of the sealing rib.

3. A fuel filter device configured to be fitted to a fuel inlet positioned in a fuel tank, comprising:
   a filter cloth formed in a bag-shape;
   a first member positioned inside the filter cloth, the first member including an inner flange portion positioned inside the filter cloth; and
   a second member connected to a member provided on a side of a fuel pump, the second member including an outer flange portion positioned outside the filter cloth, wherein a periphery of an opening of the filter cloth is clamped between the inner flange portion and the outer flange portion, the inner flange portion and the outer flange portion jointly defining a communication passage communicating inside of the filter cloth with outside of the filter cloth, and at least one of the inner flange portion and the outer flange portion is provided with a sealing rib to compress the filter cloth to ensure a sealing performance thereof, a welding rib to join the inner flange portion and the outer flange portion with each other by welding, and a shifting preventing structure configured to restrict shifting of the filter cloth, wherein the shifting preventing structure is provided between the sealing rib and the welding rib, the sealing rib being provided outside of the welding rib, wherein the shifting preventing structure includes a shifting preventing rib provided concentrically to the sealing rib and the welding rib, wherein the shifting preventing rib has a top surface having an irregular profile along a circumferential direction.

4. A fuel filter device configured to be fitted to a fuel inlet positioned in a fuel tank, comprising:

a filter cloth formed in a bag-shape;

a first member positioned inside the filter cloth, the first member including an inner flange portion positioned inside the filter cloth; and a second member connected to a member provided on a side of a fuel pump, the second member including an outer flange portion positioned outside the filter cloth, wherein a periphery of an opening of the filter cloth is clamped between the inner flange portion and the outer flange portion, the inner flange portion and the outer flange portion jointly defining a communication passage communicating inside of the filter cloth with outside of the filter cloth, and at least one of the inner flange portion and the outer flange portion is provided with a sealing rib to compress the filter cloth to ensure a sealing performance thereof, a welding rib to join the inner flange portion and the outer flange portion with each other by welding, and a shifting preventing structure configured to restrict shifting of the filter cloth, wherein the shifting preventing structure is provided between the sealing rib and the welding rib, the sealing rib being provided outside of the welding rib, wherein the shifting preventing structure includes recesses formed in an inner peripheral surface of the sealing rib.

5. The fuel filter device as defined in claim 1, wherein one of the outer flange portion and the inner flange portion is provided with the sealing rib, and another of the outer flange portion and the inner flange portion is provided with an annular recess opposite to the sealing rib, an inner peripheral shoulder part of the annular recess being higher than an outer peripheral shoulder part thereof.

\* \* \* \* \*